this purpose, the mineral oil may be relatively non-viscous and highly volatile, such as a naphtha fraction.

In addition to the oil and water in a liquid carrier 0.1 to 10% based on polymer oil of well-known, non-toxic oil-soluble type emulsifiers, may be used. Without oils but with an aqueous carrier any of the well-known non-toxic water-soluble emulsifiers, such as alkali metal soaps of fatty acids, may be used. Inert spreading agents such as bentonite may be added in a proportion of about 1 to 5 pounds per 100 gallons of liquid carrier.

The desired types of ingredients for the composition are combined readily by mixing at ordinary temperatures, which is an important factor in simplifying the work of the user. In employing other types of ingredients, the user may be compelled to make the composition up for application with application of heat to the mixture of ingredients, and the heating often results in undesirable changes, such as curdling.

An alternate method of applying the sticker may be to mix it with the emulsifier and spray this mixture separately and substantially simultaneously with the parasiticide and water whereupon the emulsification takes place in situ on the plant surface.

The parasiticide compositions prepared with the polymers have been made to contain exceptionally high concentrations of the active organic parasiticide agents and to have an exceptionally high increase in persistency as will be illustrated in the following examples:

EXAMPLE 1

An oily copolymer of butadiene and styrene was prepared according to the following recipe:

| | | |
|---|---|---|
| Butadiene | parts by wt | 80 |
| Styrene | do | 20 |
| Naphtha | do | 300 |
| Dioxane | do | 30 |
| Sodium | do | 1.5 |
| Isopropanol | do | 0.3 |
| Temperature | ° C | 50 |

Complete conversion was obtained in eight hours. The catalyst was destroyed and removed from the resulting crude product. The product was finished to contain 100% non-volatile matter as described above. This product having an intrinsic viscosity of 0.2 (2.2 poise at 50% N. V. M.) was heat bodied with 1.5% maleic anhydride to give a 9.0 poise product and with 0.2% maleic anhydride to give an 8.5 poise product. The bodied and unbodied polymers with and without driers were mixed with various amounts of a polyoxyethylated nonyl phenol in which the ethylene oxide units represent 43% of the molecule and known as Antarox A-401. The following samples were prepared:

| Sticker No. | Oily Polymer | Volume, cc. | Volume of Antarox A-401, cc. |
|---|---|---|---|
| 1 | 50% NVM, 2.2 poise vis., with driers. | 1,950 | 15.6 |
| 2 | 50% NVM, 9.0 poise vis., no driers. | 1,825 | 14.6 |
| 3 | 50% NVM, 2.2 poise vis., no driers. | 1,925 | 15.4 |
| 4 | 50% NVM, 9.0 poise vis., with driers. | 1,920 | 15.4 |
| 5 | 50% NVM, 8.5 poise vis., no driers. | 1,700 | 13.6 |

EXAMPLE 2

The efficacy of the stickers prepared according to Example 1, was determined and compared with commercial products in field tests made in Costa Rica in which tomato and potato crops were sprayed. One spray schedule was started on Marglobe tomato vines at Turrialba on June 10, and a second experiment was made on Morada Blanca potatoes was started at Cartago on July 1. In both cases the disease encountered was late blight (*Phytophthora infestans*). The early spray applications were made at 100 gallons per acre but were increased to 150 gallons per acre as the plants became larger. The spray compositions are summarized as follows: All of the N-trichloromethylthiotetrahydrophthalimide spray mixtures contained 4 lbs. of the 50% wettable powder formulation per 100 gallons of water. Unmodified N-trichloromethylthiotetrahydrophthalimide was applied both weekly and biweekly to provide data on the effect of frequency of application on disease control. Unsprayed plots as a basis of comparison yielded only 155 bushels of potatoes per acre. Each of the stickers was studied in a biweekly application of N-trichloromethylthiotetrahydrophthalimide to determine whether it could improve the performance of N-trichloromethylthiotetrahydrophthalimide. Each sticker was employed at a concentration of 1 pt. (or 1 lb. for Armour sticker) per 100 gallons of spray mixture. The data are given in the following table:

*Fungicide sticker field tests*

| Fungicide | Frequency | Sticker | Tomatoes, Percent Disease | Potatoes Percent Disease | Yield [3] |
|---|---|---|---|---|---|
| N-trichloromethylthiotetrahydrophthalimide | Biweekly | None | 50 | 72 | 281 |
| Do | do | Emulsifiable 2.2 poise polymer oil | 44 | 57 | 270 |
| Do | do | Same with driers | 42 | 69 | 266 |
| Do | do | Emulsifiable 8.5 poise polymer oil | 44 | 38 | 328 |
| Do | do | Emulsifiable 9.0 poise polymer oil | 32 | 41 | 325 |
| Do | do | Same with driers | 56 | 63 | 293 |
| Do | do | Bayol 85 [1] with 0.5% Antarox A-401 [4] | 56 | 63 | 286 |
| Do | do | Primol D [1] with 0.6% Antarox A-401 [4] | 47 | 63 | 245 |
| Do | do | Polyethylene polysulfide | 50 | 50 | 303 |
| Do | do | Polyvinyl chloride latex | 53 | 63 | 270 |
| Do | do | Dow's 515 K latex Paint [2] | 53 | 66 | 248 |
| Do | do | Linseed Oil + 1.4 vol. percent Antarox A-401 [4] | 60 | 72 | 271 |
| Do | do | Soybean Oil + 2.0 vol. percent Antarox A-401 [4] | 57 | 62 | 243 |

[1] A commercial white oil.
[2] Butadiene-styrene copolymer latex emulsion.
[3] Yield in bushels per acre.
[4] A polyoxyethylated nonyl phenol in which the ethylene oxide units represent 43% of the molecule.

The above data show conclusively that the oily polymer is an effective sticker for N-trichloromethylthiotetrahydrophthalimide fungicide and will be applicable to all types of parasiticides.

It is obvious that modifications may be made without departing from the spirit of the invention as described above. For example, it may be desirable under some circumstances to coat the vegetation with the oily diolefin polymer and then dust the parasiticide on the polymer.

The nature of the present invention having been thus fully set forth and specific examples of the same given, what is claimed as new and useful and desired to be secured by Letters Patent is:

1. A persistent fungicide comprising an aqueous emulsion of powdered N-trichloromethylthiotetrahydrophthalimide as an active fungicide, a minor amount of a water-soluble emulsifier and an oily liquid copolymer of 75–85 parts by weight of butadiene and 25–15 parts by weight of styrene having a viscosity of 8.5 to 20 poises at 50% N. V. M.

2. A method of increasing the persistency of a fungicide in the protection of vegetation against parasitic attack which comprises applying to the surface of vegetation an aqueous emulsion of N-trichloromethylthiotetrahydrophthalimide in an oily liquid copolymer of 75–85 parts by weight of butadiene and 25–15 parts by weight of styrene having a viscosity of 8.5 to 20 poises at 50% N. V. M.

3. A fungicide spray composition comprising an aqueous emulsion of N-trichloromethylthiotetrahydrophthalimide, a minor amount of water-soluble emulsifier and an oily liquid copolymer of 75–85 parts by weight of butadiene and 25–15 parts by weight of styrene having a viscosity of 8.5 to 20 poises at 50% N. V. M.

References Cited in the file of this patent

UNITED STATES PATENTS

| | | |
|---|---|---|
| 2,129,517 | Goodhue | Sept. 6, 1938 |
| 2,217,322 | Russell | Oct. 8, 1940 |
| 2,274,479 | Smyers | Mar. 3, 1942 |
| 2,322,723 | Young | June 22, 1943 |
| 2,441,553 | Britton | May 18, 1948 |
| 2,553,771 | Kittleson | May 22, 1951 |
| 2,563,997 | Elwell et al. | Aug. 14, 1951 |
| 2,586,594 | Arundale et al. | Feb. 19, 1952 |
| 2,631,175 | Crouch | Mar. 10, 1953 |
| 2,714,605 | Jones | Aug. 2, 1955 |

OTHER REFERENCES

Green: Indust. and Engin. Chem., February 1950, pages 324–330.

United States Patent Office 2,798,023
Patented July 2, 1957

2,798,023

PHARMACEUTICAL FORMULATION

Melvin L. Berger, Chicago, Ill., assignor, by mesne assignments, to Chas. Pfizer & Co., Inc., Brooklyn, N. Y., a corporation of Delaware No Drawing. Application July 29, 1953,
Serial No. 371,141

5 Claims. (Cl. 167—81)

This invention relates to pharmaceutical preparations and, in particular, to pharmaceutical preparations for dispensing diet supplements such as the essential vitamins and minerals.

The need for diet supplements such as the essential vitamins and minerals has long been recognized in the art and a number of different formulations have been prepared for dispensing such diet supplements. Such devices include the well known vitamin and/or mineral capsules as well as certain vitamin and/or mineral concentrates which may be taken orally in bulk form, such as cod liver oil. Although a normal adult is usually capable of taking the capsules or the concentrates orally, notwithstanding a certain amount of inconvenience, many adults and almost all smaller children encounter a great deal of difficulty in this respect. In particular, in the case of small children (for which the instant invention is uniquely adapted) it has been found that the children either will not or cannot swallow the ordinary capsules and they are nauseated by the taste of most bulk forms of vitamin and mineral concentrates. Also, the vitamin concentrates are particularly difficult to handle in bulk, since they usually are kept dispersed in a relatively fluid oil base, such as soya or corn oil, and such vitamins are very sensitive to heat, light, moisture etc. in most cases. The present methods of concentrating vitamins and minerals have advanced to the stage that the so called M. D. R. (minimum daily requirement) is such a small quantity that such concentrates must be diluted appreciably in order to permit effective measurement of the M. D. R. by the housewife, for example. In short, the situation has reached the point where those who probably least need diet supplements of this type are the only ones who find no difficulty in consuming the presently available capsules, etc., whereas children or ill persons who may be in very great need of such diet supplements find it difficult or impossible to consume the same in the forms now available.

It is, therefore, an important object of the instant invention to provide an improved pharmaceutical formulation, whereby the consumption of diet supplements such as the essential vitamins and minerals is greatly facilitated.

It is a further object of the instant invention to provide an improved carrier medium which may retain the essential vitamins and minerals intimately dispersed therein and which effectively protects such ingredients during storage and is palatable and easily consumed by children as well as adults.

Another object of the instant invention is to provide an improved pharmaceutical composition comprising essentially 5–25% essential vitamin and mineral concentrates and 2–3% of the weight thereof of non-toxic water-soluble cellulose ether binder, intimately dispersed in a carrier medium that consists essentially of non-toxic water-soluble polyalkylene glycol was having a melting point of 35–65° C. and $C_3$–$C_5$ dihydroxy alkane, in weight ratios of 1:2 to 2:1, plus glycerine in an amount sufficient to impart paste-like consistency to the composition.

Other objects, features and advantages of the instant invention will become apparent to those skilled in the art from the following detailed disclosure thereof.

In its more detailed aspects, the instant invention consists in an edible paste-like pharmaceutical composition, comprising 5–25% diet supplement of the class consisting of essential vitamin and mineral concentrates and mixtures thereof, 0–10% non-toxic water-soluble palatable oil absorbent of the class consisting of sugars, starch and proteins, 0–5% harmless coloring, 0.1–1% non-toxic water-soluble cellulose ether binder, 5–20% non-toxic water-soluble polyalkylene glycol wax, 5–20% non-toxic water-soluble dihydroxy alkane, and the remainder consisting essentially of glycerine with minor traces of suitable antioxidant and sweetening materials.

ESSENTIAL VITAMINS AND MINERALS

Although the instant invention is not limited specifically to a composition for use in the oral consumption of the essential vitamins and minerals, and the instant invention may be used to provide a suitable carrier for various other pharmaceuticals, it is a particularly important aspect of the instant invention that the essential vitamins and/or minerals may be used therein. It is an additionally important aspect of the instant invention that the carrier composition provided hereby is uniquely suitable for consumption by children and the preferred vitamin and mineral dosages set forth hereinafter are those ordinarily usable with children. It will be appreciated that variations in these dosages may be effected for one purpose or another in accordance with the general knowledge and skill of the art. At the outset it should be mentioned that the instant invention provides a paste-like composition which may be packaged in a collapsible tube and be extruded through a nozzle much like tooth paste to provide a given length of extruded material which will contain a known dosage. For example, it is presently contemplated that the tube dispensing device for the most preferred embodiment of the instant invention will have an orifice therein of a predetermined size (i. e. $5/16$ inch inside diameter) which will extrude a daily dose (approximately 1.5 grams) of the material which is approximately one inch long. The following discussion concerning the vitamin and mineral concentrations here used relates to the daily dosage of each of such diet supplements in the most preferred composition of the invention (i. e., that suitable for use with children).

The essential vitamins herein referred to are vitamins A, B, C and D, which are present in such variable quantities in ordinary food that deficiencies in one or more of such vitamins often takes place in a patient on an unbalanced diet.

Vitamin A is known to have important functions in connection with vision epithelial tissues and growth. Its function, particularly in connection with growth, is of course, closely correlated with the body mechanisms involved in the utilization of fat, as well as carbohydrates and proteins.

As in the case of most vitamins, the minimum daily requirement (i. e., the MDR) of vitamin A has been ascertained and is expressed in USP units. It has been found that about 4,000 USP units is the MDR for vitamin A and, accordingly, the amount of vitamin A that is combined with one day's dosage of the composition of the invention may range from about 4,000 USP units to about 8,000 USP units. It is, of course, to be understood that the instant invention does not exclude the use of a substantially greater amount of vitamin A, for example, as much as 50,000 USP units, which may be employed in the case of a severe vitamin A deficiency in the patient. However, since the purpose of the instant invention is to supply an amount of vitamin A sufficient to effectively supplement the diet, the amount of vitamin A which is ordinarily required for the purposes of the instant invention ranges from 100% to 200% of the MDR. The optimum amount of vitamin A is about 5,000 USP units or 125% of the MDR. (As used herein, the dosages of the various vitamins and minerals are dosages based upon the daily dosage of the composition unless otherwise designated.)

Vitamin B, as used generically (sometimes referred to as "Vitamin B Complex"), comprises a group of essentially water-soluble factors or enzymes present in yeast, liver and whole grain; and such factors are known to have a number of different functions in connection with the nervous and circulatory system. The factors or enzymes of vitamin B include thiamin hydrochloride, riboflavin, nicotinic acid (and niacinamide or nicotinic acid amide), pantothenic acid, pyridoxine hydrochloride, biotin, inositol, para-amino-benzoic acid, adenylic acid, choline, folic acid, and various separately designated vitamins such as vitamins I, J, L, M, U and W. Each of the foregoing species of vitamin B has also been given other names or designations, such as vitamin $B_1$, $B_2$, etc. It has been found that each of the foregoing enzymes or factors participates, in combination with other more complex enzymes, in the carrying out of the vital body functions.

Vitamin $B_1$, or thiamin hydrochloride, is a well known species of vitamin B whose function is directly connected with the nervous and circulatory systems. Vitamin $B_1$ is easily destroyed by heat and it would therefore be necessary for a patient to eat a substantial quantity of cooked food in order to consume the MDR of vitamin $B_1$, which is about one mg. In the instant invention the amount of vitamin $B_1$ used should range from about one mg. to about three mg. (i. e., 100–300% of the MDR). The use of amounts of vitamin $B_1$ substantially in excess of that range is, of course, not excluded in the case of patients suffering a severe deficiency of vitamin $B_1$. The optimum amount of vitamin $B_1$ is about 1.5 mg., since it is contemplated that at least some of the relatively unstable vitamin $B_1$ will be lost or dissipated before consumption by the body.

Vitamin $B_2$ or riboflavin (sometimes, dextro-riboflavin) is one of the relatively heat stable factors of vitamin B. The MDR of riboflavin is about 1.5 mg. and the amount of riboflavin that may be used in the practice of the instant invention ranges from about 1.5 mg. to about 3 mg., the optimum amount being about 1.5 mg.

The MDR of niacinamide has not been positively ascertained, but it has been found that the optimum amount of niacinamide for use in the instant invention is about 5 mg., which is believed to be about the MDR. Ordinarily, the amount of niacinamide that may be used in the practice of the instant invention ranges from about 5 mg. to about 30 mg.

The MDR for pantothenic acid, also a species of vitamin B, has likewise not been ascertained positively. Pantothenic acid is preferably incorporated in the composition in the form of calcium pantothenate. The amount of calcium pantothenate that may be used in the practice of the instant invention ranges from about 2 mg. to about 4 mg. and the optimum amount is about 3 mg.

The MDR of pyridoxine hydrochloride ($B_6$) has also not been ascertained, but the amount of pyridoxine hydrochloride which may be used in the practice of the present invention ranges from about 0.2 mg. to about 1 mg., the optimum amount being about 0.5 mg.

In the case of both pyridoxine hydrochloride and calcium pantothenate, it is believed that the optimum amounts are substantially equivalent to the MDR of each. In the case of each of the foregoing vitamins, it is considered for the purposes of the instant invention that the operative range recited includes the MDR.

The amount of vitamin $B_{12}$ which is used may range from 1 to 10 mg. but is preferably 5 mcg.

The other species of vitamin B hereinbefore referred to may also be incorporated in the composition of the instant invention; however, it has been found that deficiencies ordinarily do not occur as readily in the case of such vitamins as they do in the case of thiamin hydrochloride, riboflavin, pyridoxine hydrochloride, niacinamide, vitamin $B_{12}$ and pantothenic acid. Accordingly, the composition of the invention preferably contains only those six species of vitamin B last mentioned, although the composition may contain all of the species of vitamin B mentioned herein, for example, in the form of the so-called vitamin B complex. The MDR's of most of these additional vitamin B species have not been ascertained positively, although it is estimated that the MDR of each is in the neighborhood of about 1 mg.

Vitamin C, or l-ascorbic acid, is well known as the vitamin which prevents scurvy and it is also very important in the growth processes, particularly the growth of bones and teeth. Raw fruits and vegetables are ordinarily good sources of vitamin C. The MDR of vitamin C is about 30 mg. and the amount of vitamin C that may be used in the practice of the instant invention ranges from about 30 mg. to about 50 mg. The optimum amount of vitamin C is about 50 mg. or 167% of the MDR, for children.

Vitamin D may be obtained naturally from fish oils or synthetically by irradiation of 7-dehydrocholesterol or ergosterol. The MDR of vitamin D is about 400 USP units and the amount of vitamin D that may be used in the instant invention ranges from about 400 to about 1000 USP units. The optimum amount is about 1000 USP units, for children.

Vitamins other than the aforementioned vitamins A, B, C and D may also be incorporated in the composition of the instant invention. However, it has been found that deficiencies are most likely to occur in the case of one or more of the vitamins A, B, C and D in ordinary cases and, accordingly, the need for other vitamins involves essentially special considerations or peculiar circumstances not necessarily involved specifically in obesity control.

The essential minerals which are most likely to become deficient in the system of a patient include iodine (I), manganese (Mn), cobalt (Co), potassium (K), molybdenum (Mo), iron (Fe), Copper (Cu), zinc (Zn), and magnesium (Mg).

The MDR of iodine is about 0.1 mg., and the amount of iodine which may be used in the instant invention ranges from about 0.1 mg. to about 0.2 mg., the optimum amount being about 0.15 mg. Preferably, iodine is incorporated in the composition in the form of one of its salts, as for example, potassium iodide. About 1.99 mg. of potassium iodide (USP) is equivalent to 0.15 mg. of iodine.

The MDR of manganese has not yet been definitely established. The amount of manganese to be used in the instant invention ranges from about 0.2 mg. to about 1.5 mg. The optimum amount of manganese for use in the instant invention is about 0.33 mg. Preferably, manganese is incorporated in the composition in the form of a salt thereof, such as manganese sulfate. About 1.1 mg. of manganese sulfate (dried C. P.) is equivalent to 0.33 mg. of manganese.

The MDR of cobalt has not yet been ascertained. The amount of cobalt that may be used in the instant composition ranges from about 0.05 mg. to about 0.2 mg. The optimum amount of cobalt is about 0.1 mg. Preferably, cobalt is incorporated in the composition in the form of one of its salts, such as cobalt sulfate. About 0.482 mg. of cobalt sulfate ($CoSO_4 \cdot 7H_2O$) is equivalent to 0.1 mg. of cobalt.